United States Patent [19]
Meier, Jr. et al.

[11] Patent Number: 5,561,555
[45] Date of Patent: Oct. 1, 1996

[54] MICROSCOPE SUBASSEMBLY APPARATUS

[75] Inventors: Henry A. Meier, Jr., Orchard Park; Thomas F. Batten, Clarence Center; Jose L. Suro, Alabama, all of N.Y.

[73] Assignee: Leica Inc., Depew, N.Y.

[21] Appl. No.: 180,199

[22] Filed: Jan. 11, 1994

[51] Int. Cl.$^6$ .............................. G02B 21/22; G02B 7/02
[52] U.S. Cl. .................. 359/376; 359/368; 359/374; 359/643; 359/813; 359/822; 359/827
[58] Field of Search .................... 359/368, 383, 359/384, 377, 379, 364, 372, 374, 375, 376, 643, 644, 645, 646, 647, 703, 813, 822, 827, 828, 829, 830

[56] References Cited

U.S. PATENT DOCUMENTS

| | | | |
|---|---|---|---|
| 1,508,043 | 9/1924 | Barrows | 351/158 |
| 1,914,212 | 6/1933 | Ott | 359/376 |
| 2,610,545 | 9/1952 | Davidson | 359/426 |
| 3,450,456 | 6/1969 | Ullmann et al. | 359/373 |
| 3,740,121 | 6/1973 | Everett | 359/813 |
| 4,175,826 | 11/1979 | Blaha et al. | 359/384 |
| 4,272,191 | 6/1981 | Bergkvist | 356/153 |
| 4,545,655 | 10/1985 | Fantone et al. | 359/399 |
| 4,691,997 | 9/1987 | Muchel | 359/384 |
| 4,798,451 | 1/1989 | Fujiwara | 359/384 |
| 4,807,987 | 2/1989 | Bastable et al. | 351/205 |
| 5,024,513 | 6/1991 | Hayashi | 359/384 |
| 5,053,794 | 10/1991 | Benz | 354/79 |
| 5,177,636 | 1/1993 | Furuhashi | 359/384 |
| 5,235,459 | 8/1993 | Meyer et al. | 359/372 |
| 5,299,067 | 3/1994 | Kutz et al. | 359/823 |
| 5,319,493 | 6/1994 | Goldsmith | 359/372 |

FOREIGN PATENT DOCUMENTS

| | | | |
|---|---|---|---|
| 0200004 | 12/1982 | Japan | 359/643 |
| 0106528 | 3/1988 | Japan | 359/383 |
| 0626179 | 10/1981 | Switzerland | 359/383 |

*Primary Examiner*—Paul M. Dzierzynski
*Assistant Examiner*—John Juba, Jr.
*Attorney, Agent, or Firm*—Bean, Kauffman & Spencer

[57] ABSTRACT

An apparatus and method for aligning the optical elements of a microscope are disclosed wherein a fixture is provided for locating and mounting a plurality of mirrors for reflecting an object image along an optical path to an adjacent eyepiece connected to the fixture by an eyepiece holder. The eyepiece holder includes an outer sleeve attachable to the fixture, an inner sleeve transversely movable within the outer sleeve for slidably receiving the eyepiece, and positioning means comprising a plurality of angularly spaced screws extending through the outer sleeve for engaging the inner sleeve, whereby the eyepiece may be aligned on the optical path by selectively adjusting the screws.

5 Claims, 3 Drawing Sheets

MICROSCOPE SUBASSEMBLY APPARATUS

BACKGROUND OF THE INVENTION

Various conventional microscopes are known to include an eyepiece and a mirror system comprising a plurality of mirrors, whereby an object image is received from an objective or zoom portion of the microscope and successively reflected by the mirrors along an optical path to the eyepiece, from which the object image may be viewed by an operator. Where the microscope is a stereomicroscope, two such mirror systems may be used to reflect object images to a pair of focusable eyepieces.

In typical prior art constructions, optical alignment of the zoom portion, mirror system, and eyepiece along a common optical path has required precise adjustment of some or all of the mirrors relative to the zoom portion and eyepiece during assembly of the microscope. It is known to provide individual mirror mounts having adjustment screws therein for selectively positioning each individual mirror for purposes of alignment. It is also known to provide a one-piece fixture for locating and fixing the mirrors relative to each other, whereby the fixture is precisely positioned relative to the zoom portion and eyepiece to achieve alignment.

SUMMARY OF THE INVENTION

The present invention relates to microscopes, more particularly to mirror-eyepiece subassemblies for use therein, and to methods of aligning optical elements of a microscope.

It is an object of the present invention to provide a mirror-eyepiece subassembly for use in a microscope with means for selectively and precisely positioning a focusable eyepiece relative to a mirror of the subassembly.

It is a further object of the present invention to enable selective and precise alignment of a focusable eyepiece of a microscope on an optical path after assembly of the microscope.

The subassembly apparatus of the present invention generally comprises a fixture having a plurality of mounting surfaces for locating and mounting a plurality of mirrors arranged to reflect an object image along an optical path, and an eyepiece holder attachable to the fixture having means for holding an eyepiece and positioning means for aligning the eyepiece along the optical path.

In a preferred embodiment, the eyepiece holder includes an outer sleeve threadably attachable to the fixture adjacent one of the mirrors, and an inner sleeve received with radial clearance within the outer sleeve for holding the eyepiece. Positioning means preferably comprises three angularly spaced, radially adjustable set screws extending through the outer sleeve for engagement with the inner sleeve, whereby the inner sleeve and eyepiece may be transversely positioned relative to the optical path for purposes of alignment by selective adjustment of the set screws.

It may be appreciated that the present invention allows for alignment of the optical elements of a microscope to be completed after, rather than during, assembly of the microscope, thereby simplifying the assembly process and future maintenance. Alignment may be carried out by locating and securing the mirrors on the fixture, such as by spring clips, and supporting the fixture such that a first mirror mounted thereto is arranged in general alignment to receive an object image from a zoom system of the microscope. The eyepiece holder may be attached to the fixture to receive the object image from a mirror, and alignment completed by precisely and securely positioning the eyepiece via selective adjustment of the set screws.

BRIEF DESCRIPTION OF THE DRAWINGS

The nature and mode of operation of the present invention will now be more fully described in the following detailed description taken with the accompanying drawings wherein.

DETAILED DESCRIPTION

Figure 1:
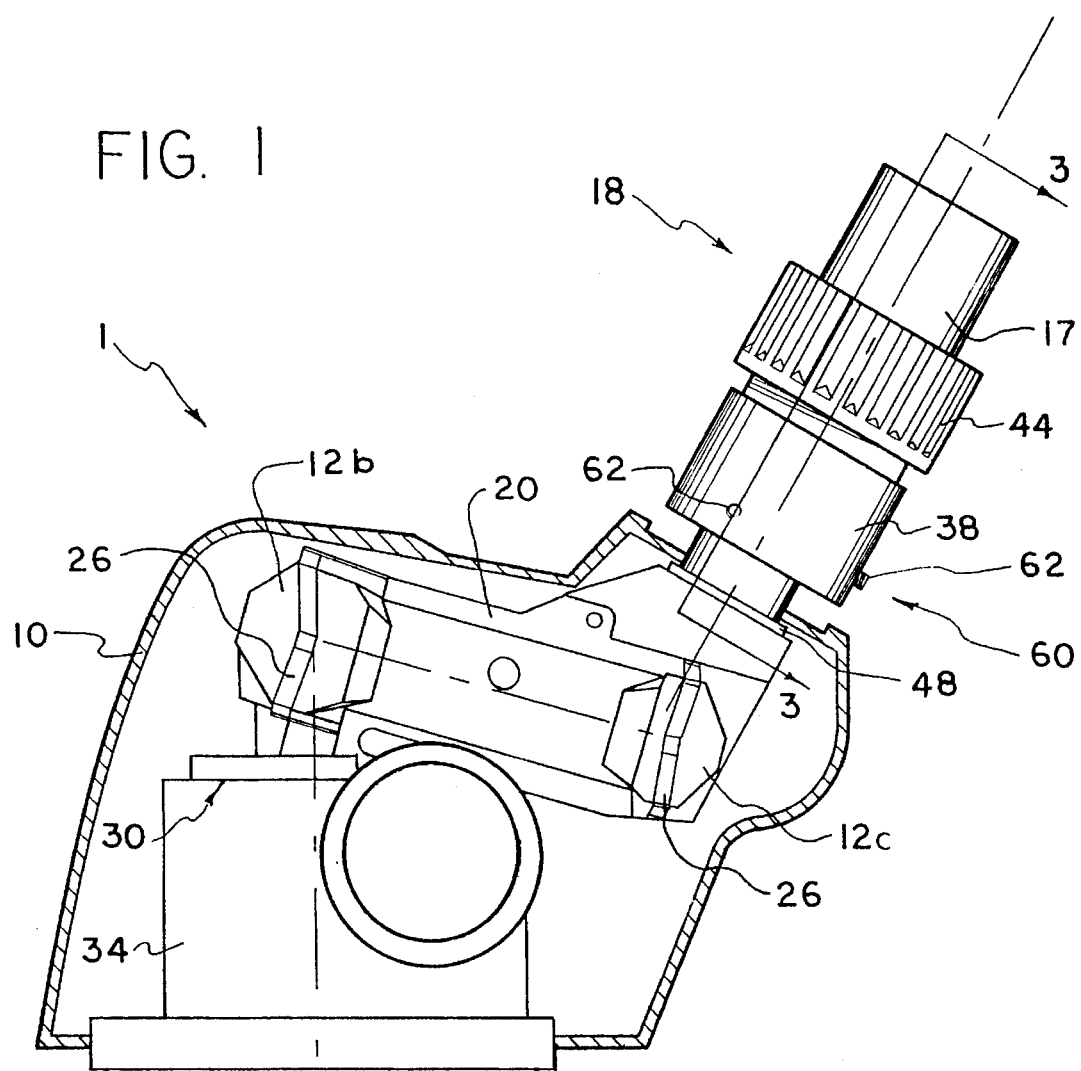
FIG. 1 is a partially sectioned side view of a microscope incorporating the present invention.

Referring first to FIG. 1, a microscope 1 is shown as generally including a housing 10 enclosing a plurality of mirrors 12a–12d for receiving an object image via a zoom system 14 and projecting the object image along an optical path 16 to an eyepiece 17 held by an eyepiece holder 18 extending from housing 10. Where microscope 1 is a stereomicroscope, there is included but not shown a second plurality of mirrors for receiving a complementary object image and projecting the complementary object image along a second optical path to a second eyepiece. In accordance with the present invention, mirrors 12a–12d and eyepiece holder 18 are coupled together as a subassembly by a fixture 20, and positioning means is provided for selectively aligning eyepiece 17 along optical path 16.

Figure 1A:
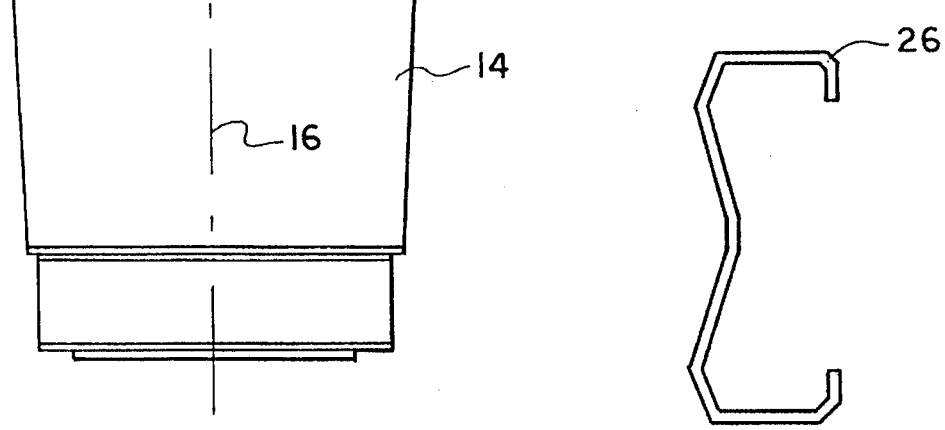
FIG. 1a is a side view of a spring clip used to practice the present invention.
Figure 2:
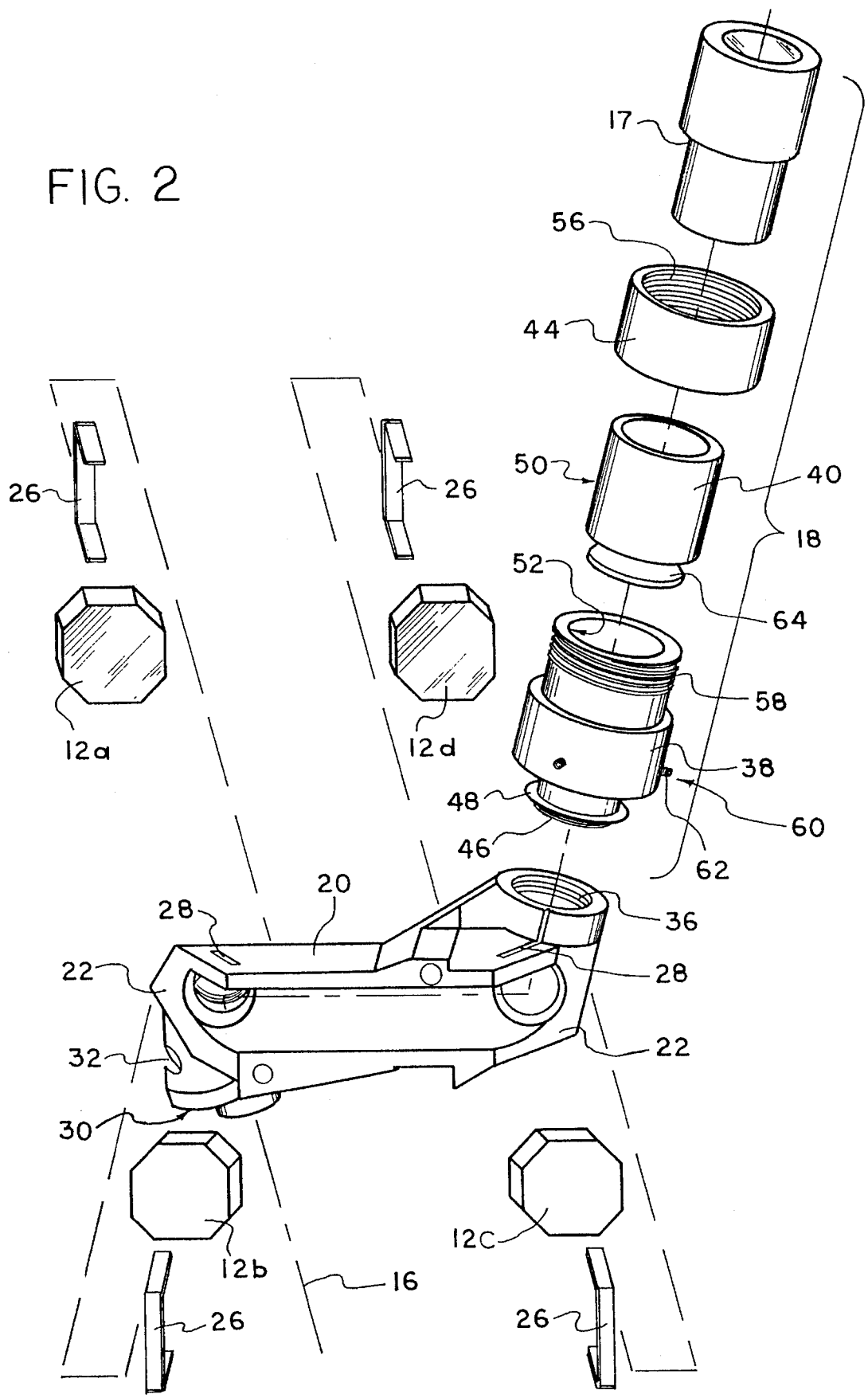
FIG. 2 is an exploded perspective view of a mirror-eyepiece subassembly formed in accordance with the present invention.

Fixture 20, illustrated in greater detail in FIG. 2, is preferably a single-piece fixture formed from a suitable material, such as a metal casting, and includes a plurality of mounting surfaces 22 for locating mirrors 12a–12d. In a preferred embodiment, a series of four mirrors are located and arranged for optical cooperation with each other to define optical path 16, such that an object image received by a first mirror 12a is successively reflected to and by a second mirror 12b, a third mirror 12c, and a fourth mirror 12d, and is thereby delivered to eyepiece 17. Mirrors 12a–12d are preferably secured on their respective mounting surfaces 22 by spring clips 26 (see FIG. 1a) having opposite ends retained in slots 28 formed in fixture 20. Fixture 20 is provided with a reference surface 30 having slotted fastener holes 32 therethrough for adjustably mounting the fixture on member 34 such that first mirror 12a may be located in general alignment to receive an object image projected through zoom system 14 along optical path 16. Fixture 20 is further provided with means for attaching eyepiece holder 18 adjacent fourth mirror 12d, specifically an internally threaded passage 36 in the preferred embodiment.

Figure 3:
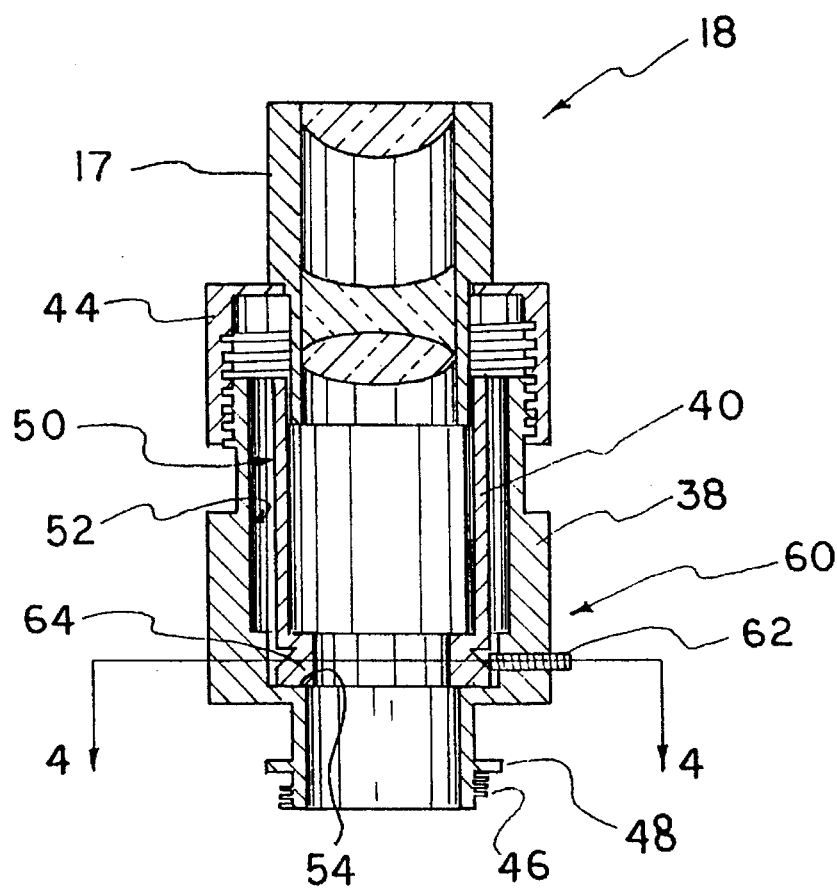
FIG. 3 is a sectional view of an eyepiece holder and eyepiece of the present invention taken along line 3—3 in FIG. 1.
Figure 4:
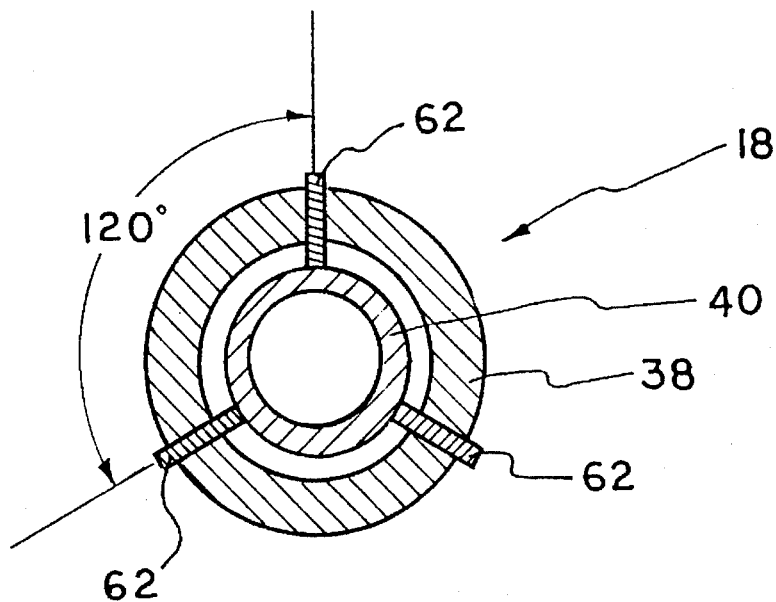
FIG. 4 is a sectional view of an eyepiece holder of the present invention taken along line 4—4 in FIG. 3.

Eyepiece holder 18, shown also in FIGS. 3 and 4, generally comprises an outer sleeve 38, an inner sleeve 40, and a focusing knob 44. Outer sleeve 38 preferably includes an externally threaded neck 46 at one end thereof for threaded engagement within passage 36 in fixture 20 and an adjacent abutment flange 48 for limiting insertion of neck 46 within passage 36. Eyepiece 17 is received within inner sleeve 40 for axially slidable, transversely restrained motion relative to inner sleeve 40. Inner sleeve 40 is sized to be received within outer sleeve 38 with sufficient clearance between respective opposing wall surfaces 50 and 52 of inner and outer sleeves 40 and 38 so as to permit selective transverse positioning of inner sleeve 40 and eyepiece 17 within outer sleeve 38 in a plane orthogonal to optical axis 16. Outer sleeve 38 is preferably provided with an internal abutment step 54 for limiting motion of inner sleeve 40 in a first axial direction (generally downward in FIGS. 2 and 3) upon insertion of inner sleeve 40 within outer sleeve 38. Focusing knob 44 engages with eyepiece 17 for effecting axially directed movement of the eyepiece along optical axis 16 and includes an internally threaded portion 56 for threaded engagement with an externally threaded portion 58 of outer sleeve 38.

Eyepiece holder 18 further comprises positioning means, designated generally at 60, for adjustably aligning eyepiece 17 along optical path 16. In the preferred embodiment, positioning means 60 includes three angularly spaced, radially adjustable set screws 62 extending through outer sleeve 38 for engagement with inner sleeve 40, which holds eyepiece 17. As best shown in FIG. 4, set screws 62 may be spaced in equal 120 degree increments around outer sleeve 38 to provide a free range of transverse movement of inner sleeve 40 within outer sleeve 38 by selective adjustment of screws 62, thereby permitting precise alignment of eyepiece 17 along optical path 16. Inner sleeve 40 preferably includes a tapered portion 64 at one end thereof intended to be engaged by screws 62, such that when screws 62 are engaged with tapered portion 64 they serve to prevent movement of inner sleeve 40 in a second axial direction (generally upward in FIGS. 2 and 3).

As may be appreciated by one skilled in the art, the present invention results in an improved method of aligning optical elements in microscope 1 by allowing precise adjustment and alignment of eyepiece 17 along optical path 16 after assembly of the microscope. In accordance with the present invention, fixture 20 may be fixably mounted on member 34 such that first mirror 12a is arranged in general, rather than precise, alignment relative to zoom system 14 along optical path 16. Slotted fastener holes 32 in fixture 20 allow for adjustable positioning of the fixture on member 34, thereby enabling such general alignment. Eyepiece holder 18 may be threadably attached to fixture 20 and eyepiece 17 slid into inner sleeve 40 to form a mirror-eyepiece subassembly and, once the microscope has been assembled, eyepiece 17 may be precisely centered along optical path 16 using positioning means 60 to provide an optically aligned microscope. With the preferred embodiment, centering of eyepiece 17 may be carried out by selectively adjusting set screws 62 engaged with tapered portion 64 of inner sleeve 40, which holds the eyepiece, to constrain the inner sleeve and eyepiece in a desired position of alignment.

Although only a certain preferred form of the present invention has been shown and described in detail, other forms are possible and changes and substitutions may be made therein without departing from the spirit of the invention as defined in the appended claims.

What is claimed is:

1. A stereomicroscope comprising a housing and a pair of complementary optical paths, each said optical path having associated therewith:

a fixture connected to said housing, said fixture having a plurality of mirrors mounted thereon for projecting an object image along said optical path;

an eyepiece for directly receiving said image from one of said mirrors and magnifying said image; and an eyepiece holder removably attached to said fixture for holding said eyepiece, said eyepiece holder including positioning means for selectively moving said eyepiece relative to said one of said mirrors for laterally aligning said eyepiece on said optical path.

2. A microscope according to claim 1, wherein said eyepiece holder includes an outer sleeve attachable to said fixture, an inner sleeve received with radial clearance within said outer sleeve, said eyepiece being axially slidable within said inner sleeve, and said positioning means comprises a plurality of angularly spaced screws extending radially through said outer sleeve for engaging said inner sleeve.

3. A microscope according to claim 2, wherein said outer sleeve is threadably attachable to said fixture.

4. A microscope according to claim 1, wherein said fixture includes a plurality of mounting surfaces for locating said plurality of mirrors.

5. A microscope according to claim 4, wherein each of said plurality of mirrors is mounted on said fixture by a spring clip.

* * * * *